Figure 1:
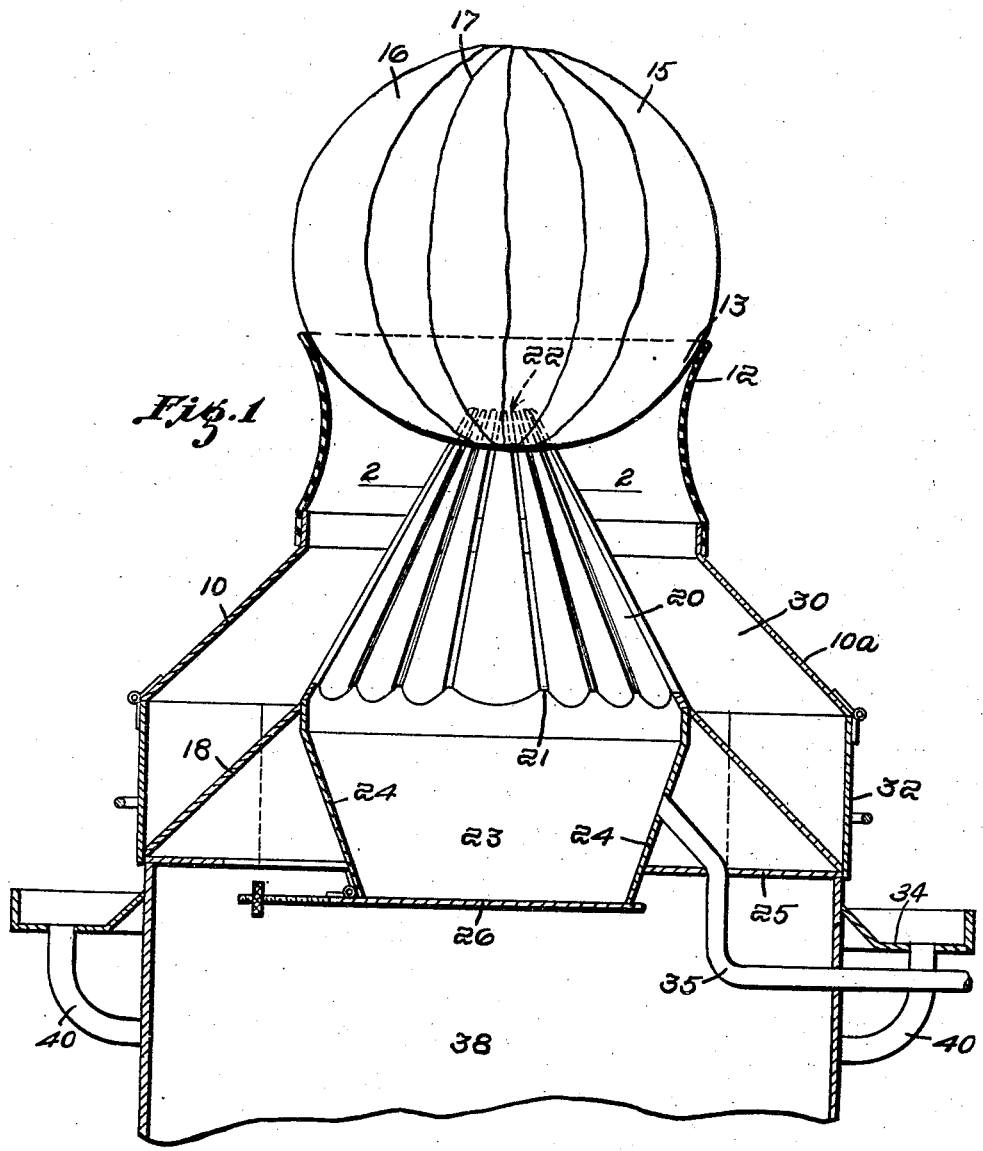

Dec. 28, 1948.  W. W. CUMMINGS  2,457,645
FRUIT SECTIONIZER
Filed July 3, 1947

Inventor:
William Warren Cummings
by Dike, Calver & Porter
Attorneys

Patented Dec. 28, 1948

2,457,645

UNITED STATES PATENT OFFICE 2,457,645

FRUIT SECTIONIZER

William Warren Cummings, Bradford, Vt.

Application July 3, 1947, Serial No. 758,797

11 Claims. (Cl. 146—3)

This invention relates to fruit sectionizers, and more particularly to sectionizers and to a method of sectionizing, designed to separate the fruit from the pulp or membrane of peeled citrus fruit, such as grapefruit or oranges, in preparation for canning or freezing.

At the present time the citrus fruit industry, so far as I am aware, uses only hand methods of sectionizing the fruit, which consists in peeling the fruit, which removes both the outer peel and the membrane covering the sections, and the sections are then cut out individually by hand with a knife, and the residual membrane or "rag," as it is called in the industry, and the seeds are then discarded and used for fertilizer or cattle feed. The industry has long been seeking a fruit sectionizer which will operate well enough and fast enough to replace the hand method now in use. Many attempts have been made to solve the problem, as disclosed by the patented art, but none of these attempts have been successful enough to find acceptance in commercial use, and the industry is still seeking a satisfactory mechanical fruit sectionizer to replace the old hand method.

I have accordingly sought to devise a sectionizer and method of sectionizing which would be satisfactory in all respects, and would operate speedily and efficiently for its intended purpose, and much faster than the present hand method, and well enough to replace the old, messy hand method.

Briefly, my invention includes a bowl-like member with a flexible collar which is designed to receive the peeled fruit. The fruit is inserted into the collar of the bowl with the core extending vertically, where the fruit is met by a series of inclined radial scoops, preferably corresponding in number to the fruit sections, which scoop out the fruit from between the radial membranes separating the sections. The fruit is pulled down into and through the bowl by means of a vacuum maintained from the bottom of the bowl and the vacuum is not broken until the fruit is separated from the "rag" and the sectionizing is complete, when the fruit sections pass into a circumferential chute around the interior of the bowl, and the "rag" is drawn or falls vertically down through the middle of the inclined scoops and drops into a compartment provided therefor. The parts of my device are so proportioned in size and width so as to maintain this vacuum until the fruit sections are cut from the rag by the radial scoops. Flap valves are provided in the fruit chute and "rag" compartment which are kept closed by the vacuum until the weight of the fruit sections and "rag" opens them. The fruit then passes out to a table or suitable container, or onto a conveyor belt, where it is packed into cans or other packages, either manually or mechanically.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Figure 2:
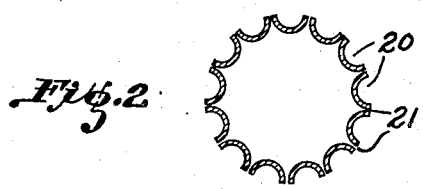

Other objects and advantages of my invention will appear in the following specification and accompanying drawing, in which Fig. 1 is a vertical section through my device, and Fig. 2 is a horizontal section on line 2—2 of Fig. 1.

In the drawing 10 represents a bowl-like member of any suitable material such as stainless steel, enamelware or glass having inclined walls 10a, and a neck 11 on which is mounted a circular collar 12, preferably of flexible material such as rubber, plastic or the like, leaving a central opening 13 down through which the citrus fruit 15 is passed. The citrus fruit, such as grapefruit or oranges, is preferably graded as to size and it will be understood that the collar 12 should be slightly smaller in diameter than the fruit it is designed to receive, so that the fruit will pass down through said collar in a slightly tight fit. However, the collar should be sufficiently flexible to accommodate reasonably variant sizes. Mounted centrally beneath said collar on a wall 18, and rigidly arranged in said bowl 10 is a conically-arranged series of radial scoops 20, preferably of metal and preferably concave, which incline downwardly and outwardly in the bowl member 10 from top to bottom and which also taper, being narrower at the top. The scoops are also preferably separate and spaced apart from one another, leaving intervening slits 21. A hollow central opening or throat 22 is thus provided between the inclined scoops which opens below into a compartment 23 formed by walls 24 arranged beneath said scoops 20 and supported by a horizontal floor 25. The compartment 23 is closed at the bottom by means of a weighted and/or spring pressed flap valve 26. Extending circumferentially around the interior of said bowl member 10 and between the walls 10a thereof and the scoops 20, an inclined chute 30 is provided, which is preferably divided into sections corresponding to and in alignment with each scoop 20. Each chute 30 is closed at its bottom end by means of a spring pressed flap valve 32 preferably suspended vertically so that the vacuum will close it and very little pressure will open it. The chutes 30 open onto an open table or gutter 34 having vertical side flanges (not shown) or to such means as a vacuum tube or conveyor belt for carrying off the sections for automatic packing. A pipe 35 is provided which opens into compartment 23 for pulling a vacuum in said compartment 23 and thence into chutes 30 when the bowl member 10 and collar 12 is closed by the fruit 15. The compartment 23 opens by means of flap valve 26 into a lower compartment 38 which may receive a coarse wire, removable screen (not shown), onto which the horizontal membrane and seeds of the fruit may fall, allowing any juice to pass through to a suitable container. If desired, a pipe 40 may be provided in the table 34 and passing into the compartment 38 to carry surplus fruit juice from said table to said compartment.

The average grapefruit contains thirteen sections or segments 16 separated from each other by a skinlike membrane. Some grapefruit have 12 and 14 sections. My device, therefore, preferably contains thirteen scoops 20 corresponding to the thirteen segments of the ordinary grapefruit, but it may be understood that sectionizers having twelve and fourteen scoops 20 may be provided, if a particular run of fruit is seen to have such even number of sections. My device having thirteen scoops, however, will readily accommodate fruit having twelve or fourteen segments satisfactorily enough. The fruit is prepared for processing for my sectionizer by being peeled in any suitable manner as now commercially practiced which preferably removes the circumferential membrane covering as well and leaves the fruit sections exposed with only the radial membrane remaining. If desired, however, peeled fruit with the circumferential membrane intact may be accommodated in my device, wherein vertical knives may be provided in or above the collar 12 to slit each segment longitudinally and approximately at the center between the two sides of the segment.

My device is operated by taking a peeled citrus fruit 15 with the circumferential membrane removed or slit as thus described and thrusting it with its central core or axis extending vertically into the open orifice 13 provided by the collar 12. The operator would normally take care to align the fruit segments as closely as possible to the scoops, and a gauge mark may be placed on the collar 12 for this purpose. But should the operator insert the fruit somewhat off the verticle axis or slightly off alinement with the scoops, the rag vanes between the sections will normally be of sufficient strength to direct the fruit into a vertical position and the scoops will follow between the rag vanes, with these vanes acting as a guide. At the same time a vacuum is formed by any suitable air pump through pipe 35 in compartment 23 and which extends into the area outside of the scoops 20 and as defined by the bowl 10 and walls 10a and the collar 12, and which are closed at the top by the fruit 15 as stated. The difference in air pressure provided by the vacuum thus formed and the atmospheric pressure thereabove thus forces the fruit 15 down onto the scoops 20 with the central core of the fruit formed by the radial membrane 17 thereof extending through the slits 21 between each scoop 20, and down through the central aperture and into the compartment 23. At the same time the same vacuum causes the fruit sections to be stripped from the membrane and to pass into the chutes 30. By the design of my device and the proportions and sizes of the parts, the vacuum thus begun is maintained until the fruit is separated from the "rag" or residual membrane and the sectionizing is complete. The vacuum will, of course, be broken at any event as soon as the fruit sections reach the chute traps 32. The degree of vacuum required to draw the fruit through the sectionizer will depend and is readily determined by the ripeness and firmness of the fruit being processed. If any seeds pass out with the fruit through the chutes 30, they may be readily separated out therefrom by means of a suitable wire screen which will pass the seeds but retain the fruit sections, or in any other suitable manner. It will thus be seen that my device will operate speedily and efficiently to accomplish its desired purpose, in separating the fruit sections from the membrane or "rag," and whereby the "rag" can be readily discarded. The fruit juice now wasted will also be fully recovered. In addition, since the sectionizing is completed without handling beyond the point of placing the fruit in the collar, it will be seen that the process is much more sanitary and that the fruit sections will be less bruised. The fruit travels through the sectionizer faster than it is possible to feed it to the sectionizer. As soon as the fruit is inserted in the collar, an immediate vacuum is created and this vacuum is held until the fruit is passed out of the collar whereupon the vacuum is automatically broken until another fruit is placed in the collar. It will be seen that if the fruit is conveyed to the sectionizer in sufficient volume, an operator can insert with ease two fruit per second, or 120 per minute. No degree of accuracy is required, as the scoops will follow the rag vanes and even though inserted at a slight angle, the pressure being equal at all points and the resistance through the vanes being greater than through the section, the fruit will quickly adjust itself so that the rag vanes will follow between the scoops. The device thus operates much faster than the hand cutting method now in use and fills a long felt want in the citrus fruit industry.

I claim:

1. A citrus fruit sectionizer comprising a bowl member having a circular collar at the top thereof adapted to receive the peeled fruit, to be arranged thereon with its segmental axis extending vertically, said bowl being sealed by the fruit when supported on said collar, a series of radial scoops corresponding to said fruit segments mounted beneath said collar for stripping the fruit from its membrane, and pumping means for exhausting the air from said bowl member to cause said fruit to pass through said bowl and against said radial scoops.

2. A citrus fruit sectionizer comprising a bowl member having a circular collar at the top thereof adapted to receive the peeled fruit, to be arranged thereon with its segmental axis extending vertically, said bowl being sealed by the fruit when supported on said collar, a conically-arranged series of radial scoops corresponding to said fruit segments mounted beneath said collar for stripping the fruit from its membrane, and pumping means for exhausting the air from said bowl member to cause said fruit to pass through said bowl and against said radial scoops.

3. A citrus fruit sectionizer comprising a bowl member having a circular collar at the top thereof adapted to receive the peeled fruit, to be arranged thereon with its segmental axis extending vertically, said bowl being sealed by the fruit when supported on said collar, a series of longitudinally extending scoops corresponding to said fruit segments mounted beneath said collar for stripping the fruit from its membrane, and pumping means for exhausting the air from said bowl member to cause said fruit to pass through said bowl and against said scoops.

4. A citrus fruit sectionizer comprising a bowl member having a circular collar at the top thereof adapted to receive the peeled fruit, to be arranged thereon with its segmental axis extending vertically, said bowl being sealed by the fruit when supported on said collar, a conically-arranged series of longitudinally extending radial scoops corresponding to said fruit segments mounted beneath said collar for stripping the fruit from its membrane, and pumping means for exhausting the air from said bowl member to cause said fruit to pass through said bowl and against said radial scoops.

5. A citrus fruit sectionizer comprising a bowl member having a circular collar at the top thereof adapted to receive the peeled fruit, to be arranged thereon with its segmental axis extending vertically, said bowl being sealed by the fruit when supported on said collar, a series of longitudinally extending, pointed and concaved scoops corresponding to said fruit segments mounted beneath said collar for stripping the fruit from its memberane, and pumping means for exhausting the air from said bowl member to cause said fruit to pass through said bowl and against said radial scoops.

6. A citrus fruit sectionizer comprising a bowl member having a circular collar at the top thereof adapted to receive the peeled fruit, to be arranged thereon with its segmental axis extending vertically, said bowl being sealed by the fruit when supported on said collar, a conically-arranged series of pointed and concaved scoops corresponding to said fruit segments mounted beneath said collar for stripping the fruit from its membrane, and pumping means for exhausting the air from said bowl member to cause said fruit to pass through said bowl and against said radial scoops.

7. A citrus fruit sectionizer comprising a bowl member having a circular collar at the top thereof adapted to receive the peeled fruit, to be arranged thereon with its segmental axis extending vertically, said bowl being sealed by the fruit when supported on said collar, a series of separated, longitudinally extending, scoops corresponding to said fruit segments having a central opening and mounted beneath said collar for stripping the fruit from its membrane, and pumping means for exhausting air from said bowl member to cause said fruit to pass through said bowl member and against said radial scoops, and the membrane to pass between said radial scoops and through the central opening therein.

8. A citrus fruit sectionizer comprising a bowl member having a flexible circular collar at the top thereof adapted to receive the peeled fruit, to be arranged thereon with its segmental axis extending vertically, said bowl being sealed by the fruit when supported on said collar, a conically-arranged series of separated, longitudinally extending, radial scoops corresponding to said fruit segments having a central opening at its vertex and mounted beneath said collar for stripping the fruit from its membrane, and pumping means for exhausting air from said bowl member to cause said fruit to pass through said bowl member and against said radial scoops, and the membrane to pass between said radial scoops and through the central opening therein.

9. A citrus fruit sectionizer comprising a bowl member having a circular collar at the top thereof adapted to receive the peeled fruit, to be arranged thereon with its segmental axis extending vertically, said bowl being sealed by the fruit when supported on said collar, a conically-arranged series of separated, pointed and concaved scoops corresponding to said fruit segments having a central opening at its vertex and mounted beneath said collar for stripping the fruit from its membrane, and pumping means for exhausting air from said bowl member to cause said fruit to pass through said bowl member and against said radial scoops, and the membrane to pass between said radial scoops and through the central opening therein.

10. A citrus fruit sectionizer comprising a bowl member having a flexible circular collar at the top thereof adapted to receive the peeled fruit, to be arranged thereon with its segmental axis extending vertically, said bowl being sealed by the fruit when supported on said collar, a conically-arranged series of separated radial scoops corresponding to said fruit segments having a central opening at its vertex and mounted beneath said collar for stripping the fruit from its membrane, a compartment beneath said central opening to receive said membrane, and pumping means for exhausting air from said bowl member to cause said fruit to pass through said bowl member and against said radial scoops, and the membrane to pass between said radial scoops and through the central opening therein, a chute to receive the stripped fruit, and flap valves in said chute and in the chamber beneath said radial scoops closable by the vacuum maintained therein.

11. A citrus fruit sectionizer comprising a bowl member having a flexible circular collar at the top thereof adapted to receive the peeled fruit, to be arranged thereon with its segmental axis extending vertically, said bowl being sealed by the fruit when supported on said collar, a conically-arranged series of separated concaved radial scoops broadening in width from top to bottom mounted in said bowl beneath said collar, a central opening at the vertex of said conically-arranged series of scoops, and a compartment beneath said scoops to receive the residual membrane, pumping means for maintaining a closed system in said bowl under vacuum to cause said fruit sections to be stripped from their membrane by said scoops, and to pass the membrane into said central compartment between said scoops, a circumferential chute to receive the stripped fruit, and flap valves in said chute and memberane compartment closable by the vacuum maintained therein.

WILLIAM WARREN CUMMINGS.

REFERENCES CITED

The following references are of record in the file of this patent:

UNITED STATES PATENTS

| Number | Name | Date |
| --- | --- | --- |
| 1,925,196 | Maull | Sept. 5, 1933 |
| 1,957,883 | Grayson | May 8, 1934 |
| 2,129,101 | Polk, Jr. | Sept. 6, 1938 |
| 2,130,949 | Collens | Sept. 20, 1938 |
| 2,396,444 | Singer | Mar. 12, 1946 |